US010754076B1

(12) United States Patent
Garner et al.

(10) Patent No.: US 10,754,076 B1
(45) Date of Patent: Aug. 25, 2020

(54) OPTICAL WAVEGUIDE ASSEMBLY FOR LIGHT FIXTURES

(71) Applicant: Focal Point, LLC, Chicago, IL (US)

(72) Inventors: Michael S. Garner, North Barrington, IL (US); Megan A. Donnelly, Darien, IL (US)

(73) Assignee: Focal Point, LLC, Chicago, IL (US)

( * ) Notice: Subject to any disclaimer, the term of this patent is extended or adjusted under 35 U.S.C. 154(b) by 0 days.

(21) Appl. No.: 16/562,275

(22) Filed: Sep. 5, 2019

(51) Int. Cl.
*G02B 6/00* (2006.01)
*F21V 8/00* (2006.01)

(52) U.S. Cl.
CPC .................. *G02B 6/001* (2013.01)

(58) Field of Classification Search
CPC ..................................................... G02B 6/001
See application file for complete search history.

(56) References Cited

U.S. PATENT DOCUMENTS

| 2007/0058388 | A1* | 3/2007 | Takatori | G02B 6/0033 362/554 |
| 2010/0254155 | A1* | 10/2010 | Capo | F21S 6/001 562/554 |
| 2016/0102834 | A1* | 4/2016 | Yamada | B60Q 1/0052 362/511 |

* cited by examiner

Primary Examiner — Anne M Hines
(74) Attorney, Agent, or Firm — Greenberg Traurig, LLP

(57) ABSTRACT

A light distribution apparatus for a light fixture includes an input coupler at a first end, at least one curvilinear waveguide extending between the first end and a second end, and a respective set of extraction features formed along the surface of the curvilinear waveguide. The input coupler may be positioned about a light source and direct light emitted therefrom into the pair of curvilinear waveguide. The curvilinear waveguide may transmit light from the input coupler toward the second end through total internal reflection. The extraction features cause light incident thereon to refract and exit the waveguide. The example light distribution apparatus may convey light from one or more light sources to one or more otherwise poorly lit regions of a light fixture, to provide enhanced aesthetics, without adding supplemental light sources or adversely compromising the design and structure of a light fixture.

11 Claims, 11 Drawing Sheets

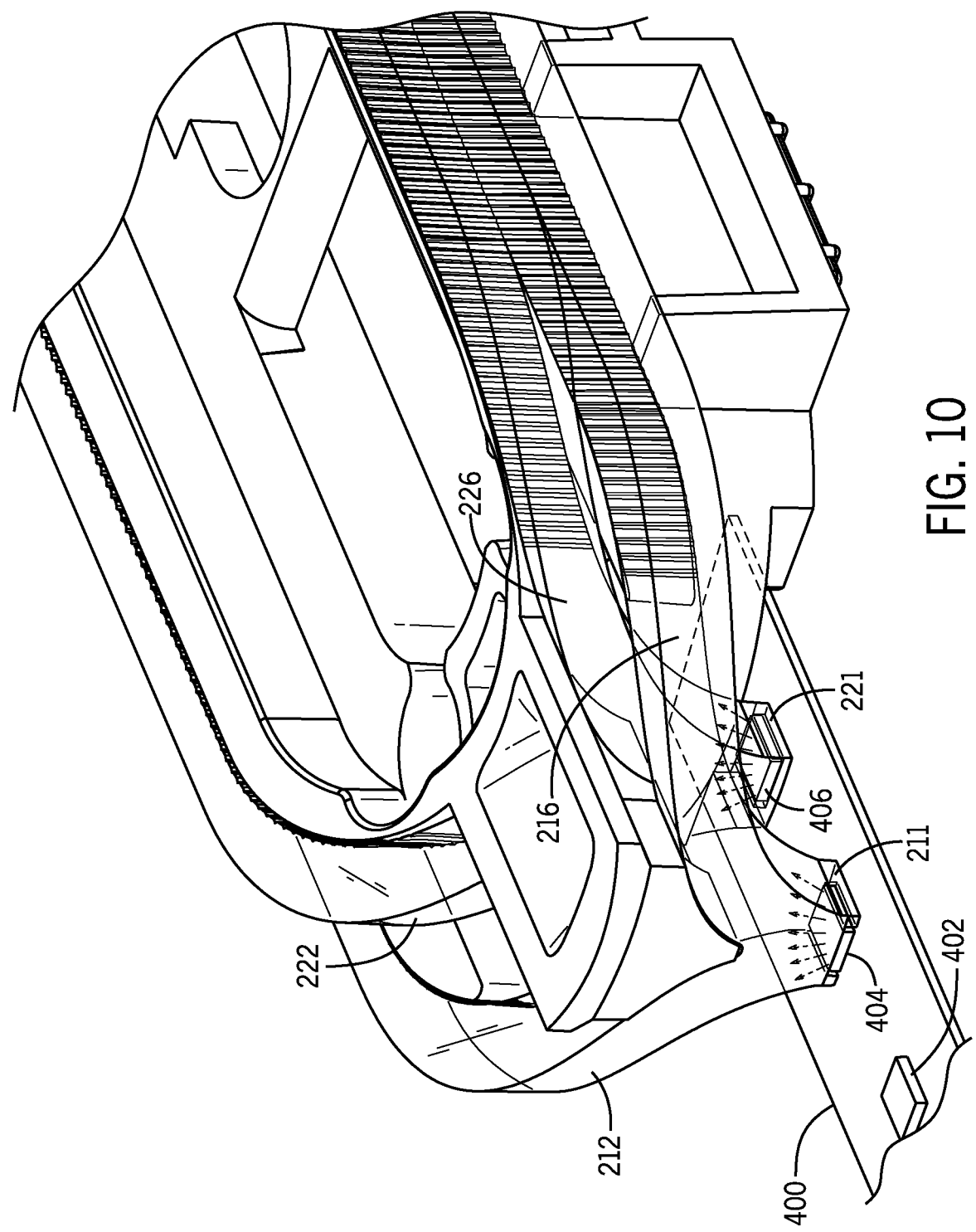

OPTICAL WAVEGUIDE ASSEMBLY FOR LIGHT FIXTURES

FIELD OF THE INVENTION

The present invention relates generally to light distribution apparatuses, and more specifically to optical waveguides for directing light from one or more light sources to one or more regions within a light fixture.

BACKGROUND OF THE INVENTION

Light fixtures typically include one or more light sources (e.g., light bulbs, LEDs, etc.) that emit light which is reflected, distributed, diffused, or otherwise directed in one or more directions through and out of a light fixture (e.g., a lamp, sconce, pendant, chandelier, etc.). In some instances, a light fixture may include one or more diffusing elements, such as lampshades, lenses, diffusers and/or other elements that are transparent or translucent. Such diffusing elements may serve to soften and distribute light in an aesthetically pleasing manner.

Traditionally, light fixtures have been illuminated using incandescent or fluorescent light bulbs. Beneficially, such typical light sources emit light with substantially even brightness in all directions, such that diffusing elements appear to be substantially evenly lit. For example, an incandescent bulb may emit light omnidirectionally, such that a cylindrical lampshade surrounding the light bulb may appear to be more or less evenly lit. Likewise, an elongated light fixture may appear evenly lit by one or more long fluorescent bulbs, which span substantially across the length of the light fixture.

As energy efficiency is becoming increasingly prioritized, it has become desirable to replace traditional light bulbs with lower power alternatives, such as light emitting diodes (LEDs). LEDs advantageously convert electric currents into light, with substantially less energy being expended in the form of heat, as compared to traditional alternatives. However, LEDs pose a few potential aesthetic drawbacks compared to traditional light sources. For example, LEDs typically emit light directionally within some angle of emission, which is often narrower and more directional than with incandescent or fluorescent bulbs. In addition, LEDs are often small in size, such that illuminating an entire light fixture requires a series of LEDs laid out in an array. Because of these aesthetic challenges, light fixtures may include design elements, diffusers, and/or other structures included therewithin to diffuse and distribute light throughout the light fixture—such that an observer may not easily perceive that the light fixture is illuminated by a series of small, directionally-narrow LEDs.

In some circumstances, it may be infeasible for a light fixture to include the same density of LEDs across its entire length. For example, a power cord, suspension cable, joiner bracket and/or other hardware may be positioned along the path of the LEDs, such that the LEDs are interrupted or otherwise do not continue to the ends of the light fixture. As a result, a lens or diffuser positioned about the LEDs may appear to have non-uniform brightness, with regions directly proximate to the LEDs appearing brighter than regions not immediately proximate to the LEDs. It is therefore an object of the present invention to provide assemblies and apparatuses for distributing light from one or more light sources toward one or more otherwise dim regions of a light fixture to, in turn, produce more even illumination throughout the light fixture for a brighter and/or more aesthetically pleasing appearance.

These and other objectives and advantages of the present invention will become apparent from the following detailed written description, drawing figures, and claims.

SUMMARY OF THE INVENTION

To accomplish the aforementioned objectives, embodiments of the present invention provide for a light distribution apparatus that receives light from one or more light sources, transmits that light along optical waveguides away from the light sources, and refracts that light toward one or more regions of a light fixture that are not immediately proximate to a light source and/or are insufficiently illuminated by the pre-positioned light sources in the light fixture. The light distribution apparatus may include one or more input couplers for positioning about and/or over respective light sources. Light received via the input couplers may be substantially, internally reflected and travel along one or more optical waveguides to carry the light away from the one or more light sources. Extraction features—shapes formed within a surface such as triangular depressions, parabolic depressions, "teeth," or other shapes—may be formed within surfaces of the one or more optical waveguides part way between the input couplers and the opposite end of the light distribution apparatus. The extraction features may create interfaces within the optical waveguides that cause light to be refracted at a sufficiently acute angle so as to exit the optical waveguide and be directed substantially transversely relative to the length of the light distribution apparatus to "fill" the dim region with light. Light refracted by the extraction features may thus be directed toward the one or more insufficiently lit regions of a light fixture, thereby increasing the uniformity of the illumination across the entire length of a light fixture—even though the otherwise dimly lit regions are some distance away from the light emitting sources.

In some embodiments of the present invention, the extraction features along a particular surface of an optical waveguide may have a non-uniform size, shape, and/or depth. As light travels along the optical waveguide, some of that light is extracted out of the optical waveguide by way of an extraction feature, before reaching the end of the light distribution apparatus opposite the input coupler. As a result, the luminous flux or luminous intensity through a given section of the optical waveguide may be relatively higher nearer the input coupler, and may decrease moving toward the end opposite the input coupler. The extraction features along a particular surface of an optical waveguide may therefore increase in size, length, depth, density, and/or pitch; moving from the input coupler to the end opposite the input coupler of the light distribution apparatus—to, in turn, promote increased light extraction and compensate for the diminishing "density" of light traveling along the optical waveguide.

According to a first aspect of the present invention, there is provided a light distribution apparatus for a light fixture, for directing light emitted from one or more light sources toward one or more regions. The light distribution apparatus includes an input coupler adapted for positioning about a light source and configured to direct light emitted by the light source along a first path and a second path. The light distribution also includes a first curvilinear waveguide having a first end and a second end. The first end of the first curvilinear waveguide may extend from the input coupler.

The first path is defined by the input coupler and the first curvilinear waveguide. The light distribution apparatus further includes a second curvilinear waveguide having a first end and a second end, which extends from the input coupler. The second path is defined by the input coupler and the second curvilinear waveguide. Additionally, the light distribution apparatus includes a first set of extraction features formed along a surface of the first curvilinear waveguide. The first set of extraction features serve to refract and direct light transmitted along the first path out of the first curvilinear waveguide. Further, the light distribution apparatus includes a second set of extraction features formed along a surface of the second curvilinear waveguide, which likewise refracts and directs light transmitted along the second path out of the second curvilinear waveguide.

In some embodiments according to the first aspect, the first set of extraction features extends between the first and second ends of the first curvilinear waveguide. In these embodiments, the first set of extraction features may include a first extraction feature proximate to the first end and a second extraction feature proximate to the second end. The first extraction feature may have a first size and said second extraction feature may have a second size that is larger than the first size, such that the extraction features increase in size moving from the first end toward the second end.

In some embodiments according to the first aspect, the light distribution apparatus further includes a first reflector positioned adjacent to the first set of extraction features. The first reflector may be adapted to reflect light which is refracted by the first set of extraction features and incident on a surface of the first reflector toward a first region, such as an underlit portion of a lens or diffuser of a light fixture. Similarly, the light distribution apparatus may also include a second reflector positioned adjacent to the second set of extraction features, which is adapted to reflect light refracted by the second set of extraction features and incident on a surface of the second reflector toward a second region (e.g., another underlit portion of a lens or diffuser of a light fixture).

In some embodiments according to the first aspect, the input coupler, the first curvilinear waveguide, and the second curvilinear waveguide form an optical waveguide. In these embodiments, the light distribution apparatus also includes a support structure having a shape that is substantially complementary with the optical waveguide. The support structure may be adapted to engage with the optical waveguide for maintaining the optical waveguide in position with respect to a light fixture. In some implementations, the support structure may include one or more apertures for receiving one or more respective fasteners configured to engage with a portion of a light fixture to rigidly couple the light distribution apparatus thereto.

In some embodiments according to the first aspect, the input coupler is a first input coupler adapted for positioning about a first light source. In these embodiments, the light distribution further includes a second input coupler adapted for positioning about a second light source and configured to direct light emitted by the second light source along a third path and a fourth path. The light distribution may also include a third curvilinear waveguide having a first end and a second end, which extends from the second input coupler. The third path may be defined by the second input coupler and the third curvilinear waveguide. Additionally, the light distribution apparatus may include a fourth curvilinear waveguide having a first end and a second end, with the first end of the fourth curvilinear waveguide extending from the second input coupler. The fourth path may be defined by the second input coupler and the fourth curvilinear waveguide. Further, the light distribution apparatus may include a third set of extraction features formed along a surface of the third curvilinear waveguide that refracts and directs light transmitted along the third path out of the third curvilinear waveguide. The light distribution apparatus may also include a fourth set of extraction features formed along a surface of the fourth curvilinear waveguide that refract and direct light transmitted along the fourth path out of the fourth curvilinear waveguide. The first path and the third path may be substantially adjacent such that the first and third sets of extraction features direct light in substantially similar directions. Likewise the second path and the fourth path may be substantially adjacent such that the second and third sets of extraction features direct light in substantially similar directions.

In some embodiments according to the first aspect, the light distribution apparatus has a first end proximate to the first input coupler and a second end proximate to the second ends of the first and second curvilinear waveguides. In these embodiments, the second input coupler may be positioned between the first input coupler and the second end of the light distribution apparatus.

In some embodiments according to the first aspect, the third curvilinear waveguide at least partially vertically overlaps with the first curvilinear waveguide, and the fourth curvilinear waveguide at least partially vertically overlaps with said fourth curvilinear waveguide.

According to a second aspect of the present invention, there is provided a light fixture assembly. The light fixture assembly includes a housing having a first end and a second end. The light fixture assembly also includes a plurality of light sources extending between a first location proximate to the first end of the housing and a second location proximate to the second end of the housing, in which an underlit section of the housing extends between its first end and the first location. The light fixture assembly further includes diffuser extending substantially between the first and second ends of the housing adapted to direct light emitted by the plurality of light sources in a direction transverse to a direction defined by the first and second ends of the housing. Additionally, the light fixture assembly includes a light distribution apparatus for directing light emitted from one or more of the plurality of light sources toward the underlit section of the housing. The light distribution apparatus includes at least one input coupler positioned about a light source of the plurality of light sources proximate to the first location, the at least one input coupler being configured to direct light emitted by the light source along a path. The light distribution apparatus also includes a curvilinear waveguide having a first end and a second end, the first end of the curvilinear waveguide extending from the input coupler and toward the first end of the housing. The path may be defined by the input coupler and the first curvilinear waveguide. The light distribution apparatus further includes a set of extraction features formed along a surface of the curvilinear waveguide, in which the set of extraction features refracts and directs light transmitted along the path out of the curvilinear waveguide and toward a portion of the diffuser covering the underlit section of the housing.

According to a third aspect of the present invention, there is provided a light distribution apparatus for a light fixture, for directing light emitted from one or more light sources toward one or more regions. The light distribution apparatus includes a first input coupler adapted for positioning about a first light source and configured to direct light emitted by the first light source along a first path. The light distribution apparatus also includes a second input coupler adapted for positioning about a second light source and configured to direct light emitted by the second light source along a second path. The light distribution apparatus further includes a first curvilinear waveguide having a first end and a second end, the first end of the first curvilinear waveguide extending from the first input coupler. The first path is defined by the first input coupler and the first curvilinear waveguide. Additionally, the light distribution apparatus includes a second curvilinear waveguide having a first end and a second end, the first end of the second curvilinear waveguide extending from the second input coupler. The second path is defined by the second input coupler and the second curvilinear waveguide. Further, the light distribution apparatus includes a first set of extraction features formed along a surface of the first curvilinear waveguide, in which the first set of extraction features directs light transmitted along the first path out of the first curvilinear waveguide. The light distribution apparatus also includes a second set of extraction features formed along a surface of the second curvilinear waveguide, in which the second set of extraction features directs light transmitted along the second path out of the second curvilinear waveguide.

The foregoing summary is illustrative only and is not intended to be in any way limiting. In addition to the illustrative aspects, embodiments, and features described above, further aspects, embodiments and features will become apparent by reference to the drawing figures, the following detailed description, and the claims.

BRIEF DESCRIPTION OF THE DRAWINGS

For a better understanding of the invention, and to show how the same may be implemented, there will now be described by way of example specific embodiments, methods and processes according to the present invention with reference to the accompanying drawings in which:

FIG. 10 is a perspective view of the example light distribution assembly of FIG. 1 positioned about a pair of light sources.

DETAILED DESCRIPTION OF THE EMBODIMENTS

Figure 1:
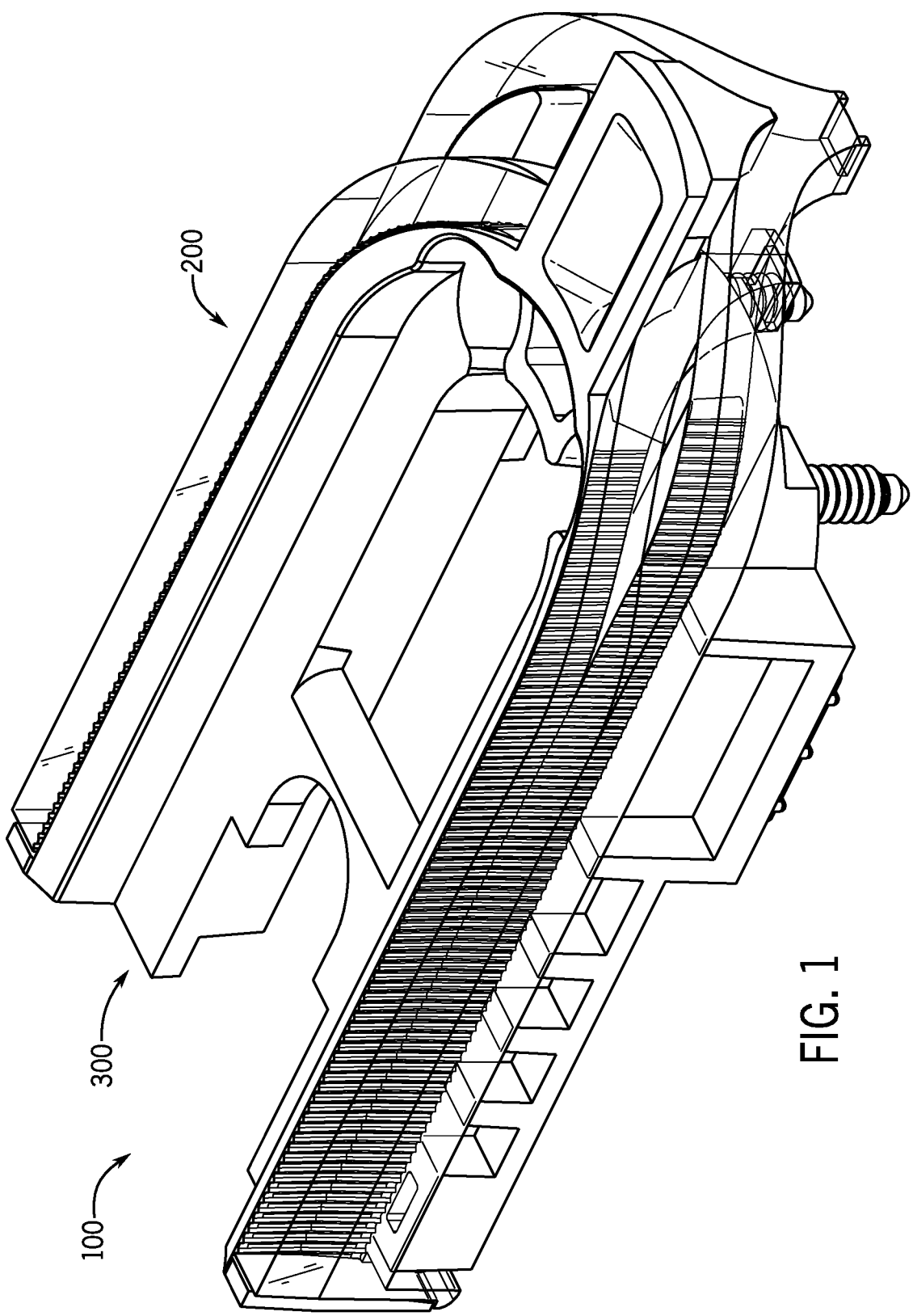
FIG. 1 is a perspective view of an example light distribution assembly of the present invention positioned over a fixture's light source support structure.

There will now be described by way of example, several specific modes of the invention as contemplated by the inventors. In the following description, numerous specific details are set forth in order to provide a thorough understanding. It will be apparent however, to one skilled in the art, that the present invention may be practiced without limitation to these specific details. In other instances, well known methods and structures have not been described in detail so as not to unnecessarily obscure the description of the invention.

Embodiments of the present invention provide a light distribution apparatus for receiving light from one or more light sources, transmitting light along one or more optical waveguides, and directing light out of the one or more optical waveguides toward one or more respective regions away from the one or more light sources. As described above, some light fixtures may be fitted with one or more light sources that collectively do not span across the entire length of the light fixture. For example, some light fixtures may include an array or strip of light emitting diodes (LEDs) that extend substantially along the length of the light fixture, but do not fully extend to the ends of the light fixture. As a result, a lens or diffuser positioned about the LEDs may appear dimmer near the edges of the fixture and comparatively brighter near the LEDs.

In some circumstances, it may be infeasible to have the light sources of a light fixture extend all the way to the ends of the fixture. For example, a rectangular light fixture may be suspended from the ceiling (e.g., as a pendant light), and may include hardware for coupling either suspension or power transmission cables attached at or near the ends of the light fixture. Depending on the arrangement of the mounting hardware, or location of the power connection, the mounting hardware or power connection themselves may render it difficult or impossible to extend a strip of LEDs all the way to the ends of the rectangular light fixture. As a result, the distal portions of the rectangular light fixture may appear dimmer than the remainder of the light fixture, due to the lack of LEDs immediately illuminating those distal portions of the fixture.

The present application addresses the realization that optical waveguides, such as a clear acrylic structures, may be used to passively transmit light from one region to another region, with little to no loss of light due to a phenomenon known as total internal reflection (TIR). An optical waveguide structure may be constructed in which light is conveyed from an input region (e.g., from an LED) to an output region (e.g., a region of a light fixture that is not immediately proximate to an LED) by way of TIR. For example, the optical waveguide may include paths that curve in a manner that ensures that most of the light beams travelling therethrough are incident on the sides of the waveguide at a sufficiently oblique angle, such that the light is maintained within the optical waveguide. Toward the end of the optical waveguide opposite the input end, transmitted light may be directed out of the optical waveguide through one or more "extraction features," or shapes formed along a surface of the optical waveguide that causes light to become incident on an acute angle and to refract out of the optical waveguide.

In an example implementation, a light distribution apparatus may be positioned about, or otherwise optically coupled with, one or more light sources, such as LEDs. Light emitted from the one or more light sources may be transmitted through the light distribution apparatus by way of TIR. As light travels from an input end of the light distribution apparatus toward its opposite end, it becomes incident on one of the extraction features, causing the light to refract and exit the light distribution apparatus. In some embodiments, one or more reflectors may be positioned along the extraction features, which causes light refracted out through the extraction features to be directed in a particular direction (e.g., toward a lens or diffuser).

In this manner, light may be directed from one or more light sources toward one or more regions away from the one or more light sources, to enable the illumination of an otherwise dim region of a light fixture.

Various aspects of a light distribution apparatus—including the sizes, shapes, and arrangement of support structures, optical waveguide sections, and extraction features—may be specifically configured, proportioned, and arranged in order to substantially distribute light from one or more light sources toward one or more regions away from the light sources. In an example light fixture system, the optical waveguide may direct light emitted upwardly from one or more LEDs, transmit the light axially along the light fixture, and direct the light horizontally outward, toward and through one or more regions of a diffuser or lens. The following description with respect to FIGS. 1-10 illustrates an example light distribution apparatus for directing light toward one or more regions to produce substantially even illumination along the length of the light fixture.

As described herein, an "optical waveguide" may refer to any structure adapted to transmit light from one section to another section. Optical waveguides may be constructed from acrylic (e.g., Poly(methyl methacrylate), or PMMA), silica glass, polyurethane, epoxy based resins, and/or any other material that has a sufficiently low propagation loss. The shape of an optical waveguide may be such that light received at an input coupler of the waveguide is incident on its walls at a sufficiently oblique angle, such that total internal reflection (TIR) occurs.

As described herein, an "extraction feature" refers to any shape formed within a surface of an optical waveguide (or a section of an optical waveguide) that causes light reflecting within the optical waveguide to refract and exit the optical waveguide. An extraction feature may be "sharp"-edged (e.g., triangular), parabolic or semi-circular, or of any other suitable shape that causes light incident thereon to hit at a sufficiently acute angle so as to exit the optical waveguide.

As described herein, an "input coupler" refers to any structure formed within a light distribution apparatus adapted to be positioned about or over a light source, and to direct light from that light source along one or more paths through one or more respective optical waveguide sections. An input coupler may have a size, shape, and structure configured to correspond to a specific light source (e.g., a specific surface mounted LED package and size).

As described herein, "curvilinear" refers to any shape that is bounded by curved lines that substantially maintains TIR through an optical waveguide (e.g., where the angle of incidence of a substantial majority of the light received at an input coupler is sufficiently oblique so as to maintain TIR). The degree of curvature permitted to maintain TIR may depend on the wavelength(s) of light transmitted therethrough, the material used in constructing an optical waveguide, and/or other relevant factors. Shapes other than curvilinear shapes, such as angular shapes, may also be used as the extraction feature.

The following description of FIGS. 1-10 may include orientation terminology such as "top," "bottom," "horizontal," "input end," "output end," "first end," and "second end," among other terms. As described herein, the "first end" and the "input end" generally refer to the end of a light distribution apparatus or assembly nearest the input coupler(s), and the "second end" and "output end" generally refer to the end opposite the first end or input end. The "bottom" of the light distribution apparatus refers to the portion of the apparatus near the input couplers, while the "top" of the light distribution apparatus refers to the portion substantially opposite the bottom.

FIG. 1 is a perspective view of an example light distribution assembly 100 of the present invention. The light distribution assembly 100 includes light distribution apparatus 200 and support structure 300. Support structure 300 has a shape complementary to that of light distribution apparatus 200, and may serve as both a skeleton to provide structural rigidity to light distribution apparatus 200, as well as the support surface for the fixture's LEDs or other sources of light. In some embodiments, support structure 300 may be configured to receive mounting hardware (e.g., fasteners, such as screws) to rigidly secure light distribution assembly 100 to a light fixture (e.g., by extending screws through the mounting points of support structure 300 to corresponding screw bosses, rails, and/or other structures in a light fixture).

Figure 2:
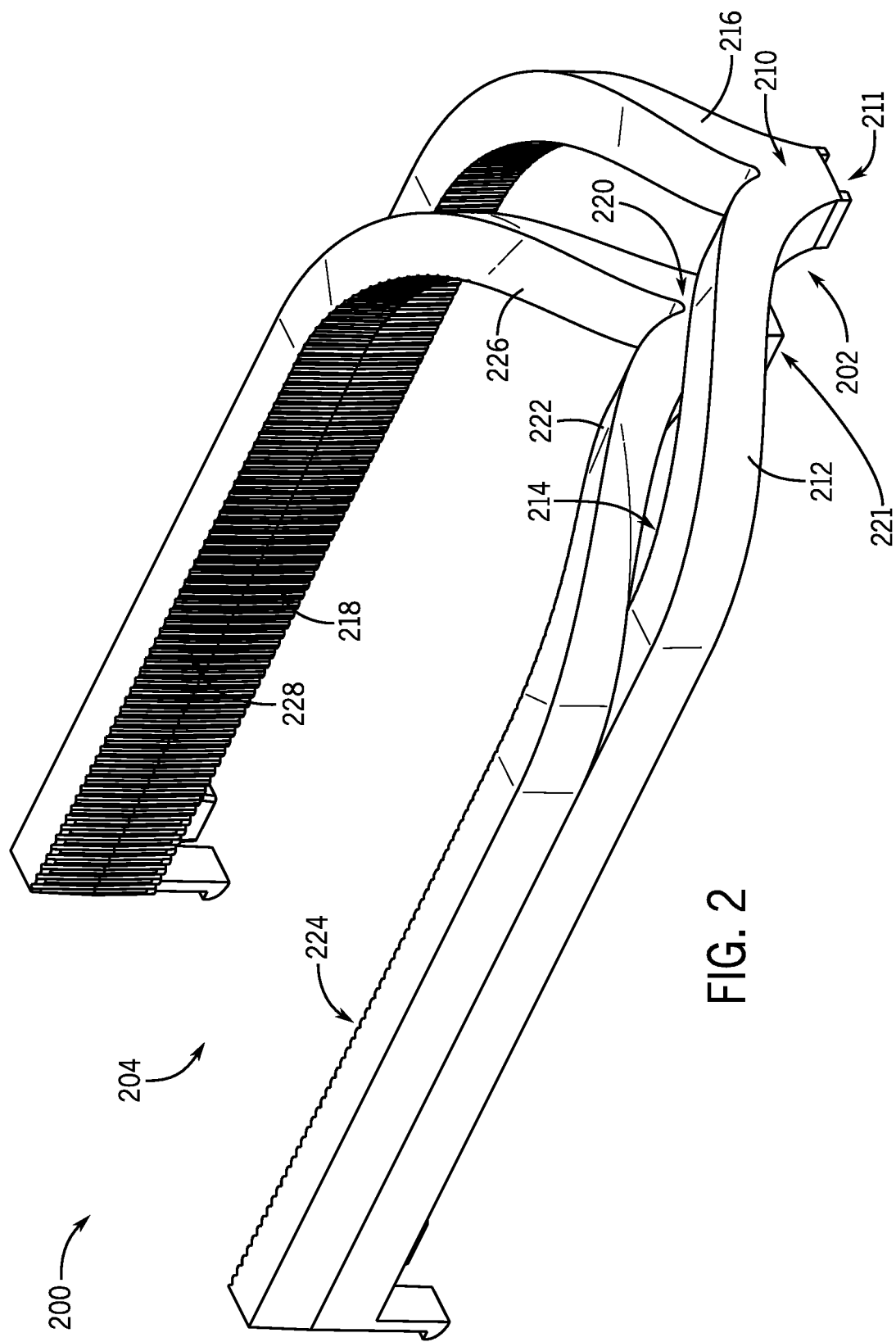
FIG. 2 is a perspective view of an example light distribution apparatus, according to the embodiment of FIG. 1.

FIG. 2 illustrates a perspective view of light distribution apparatus 200, which has a first end 202 and a second end 204 opposite the first end 202. In this example embodiment, light distribution apparatus 200 includes first waveguide 210 and second waveguide 220. First waveguide 210 includes input coupler 211 adapted for receiving light from a light source, such as an LED, forming a substantially Y-shaped or wishbone-shaped splitting region to transmit light along waveguide section 212 and waveguide section 216. Similarly, second waveguide 220 includes input coupler 221 adapted for receiving light from a different light source as that of input coupler 211, and forms a substantially wishbone-shaped split to convey light along waveguide sections 222 and 226.

As shown in FIG. 2, input coupler 221 is positioned nearer second end 204 than input coupler 211. However, waveguide sections 222 and 226 extend over and above waveguide sections 212 and 216, respectively, and converge, such that portions of waveguide sections 212 and 222 immediately overlap, while portions of waveguide sections 216 and 226 also immediately overlap. The inner surfaces of waveguide sections 212, 216, 222, and 226—that is, the surfaces of waveguide sections 212 and 216 facing each other, and the surfaces of waveguide sections 222 and 226 facing each other—have formed therein extraction features 214, 218, 224, and 228, respectively. Extraction features 214, 218, 224, and 228 may each include a plurality of waves, dips, edges, curves, angles and/or other shapes that cause light transmitted along its respective waveguide section and incident thereon, to exit the optical waveguide and travel in a direction transverse to the length of the waveguide section.

Figure 8:
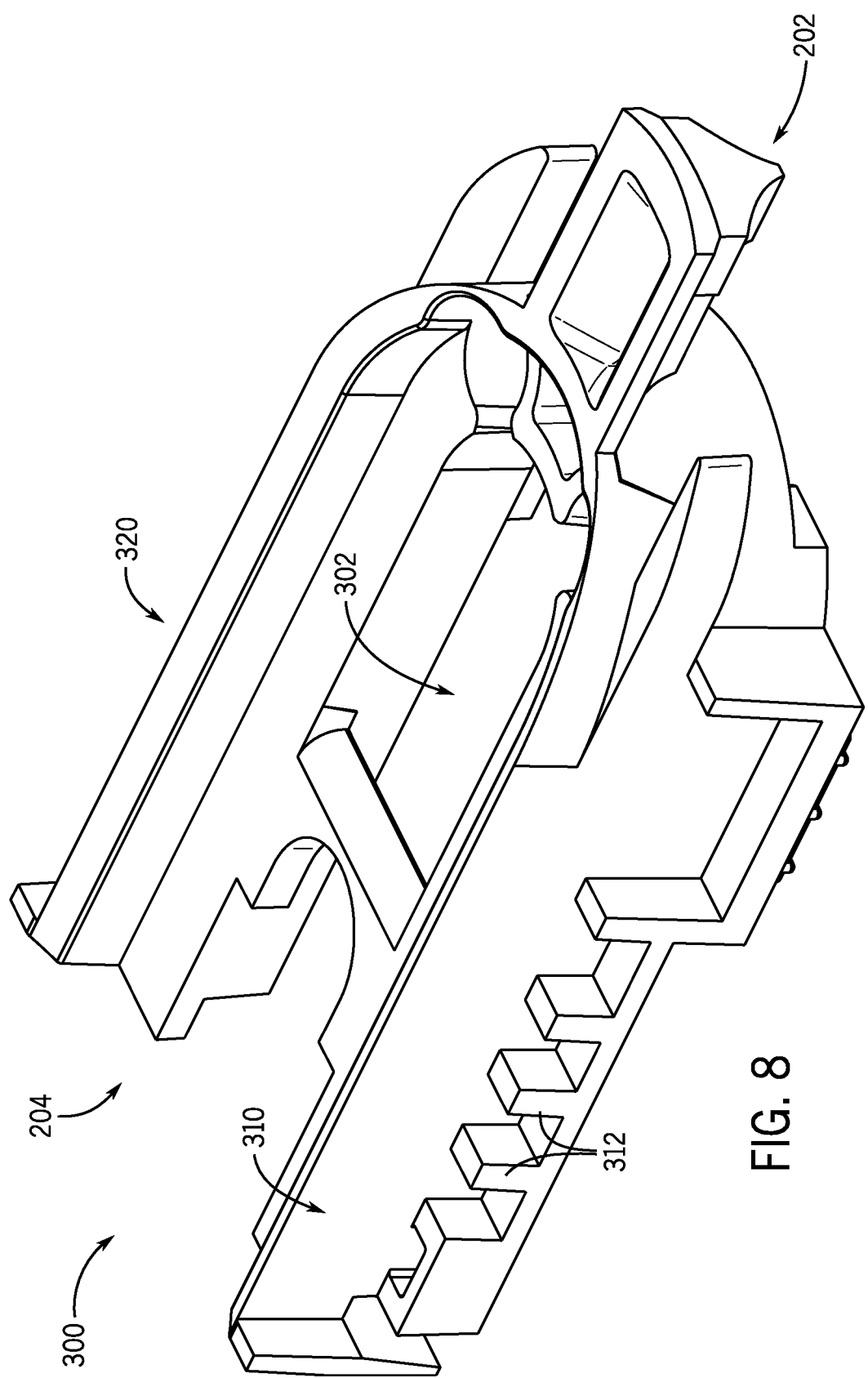
FIG. 8 is a top perspective view of an example support structure for supporting a light distribution apparatus, according to the embodiment of FIG. 1.
Figure 9:
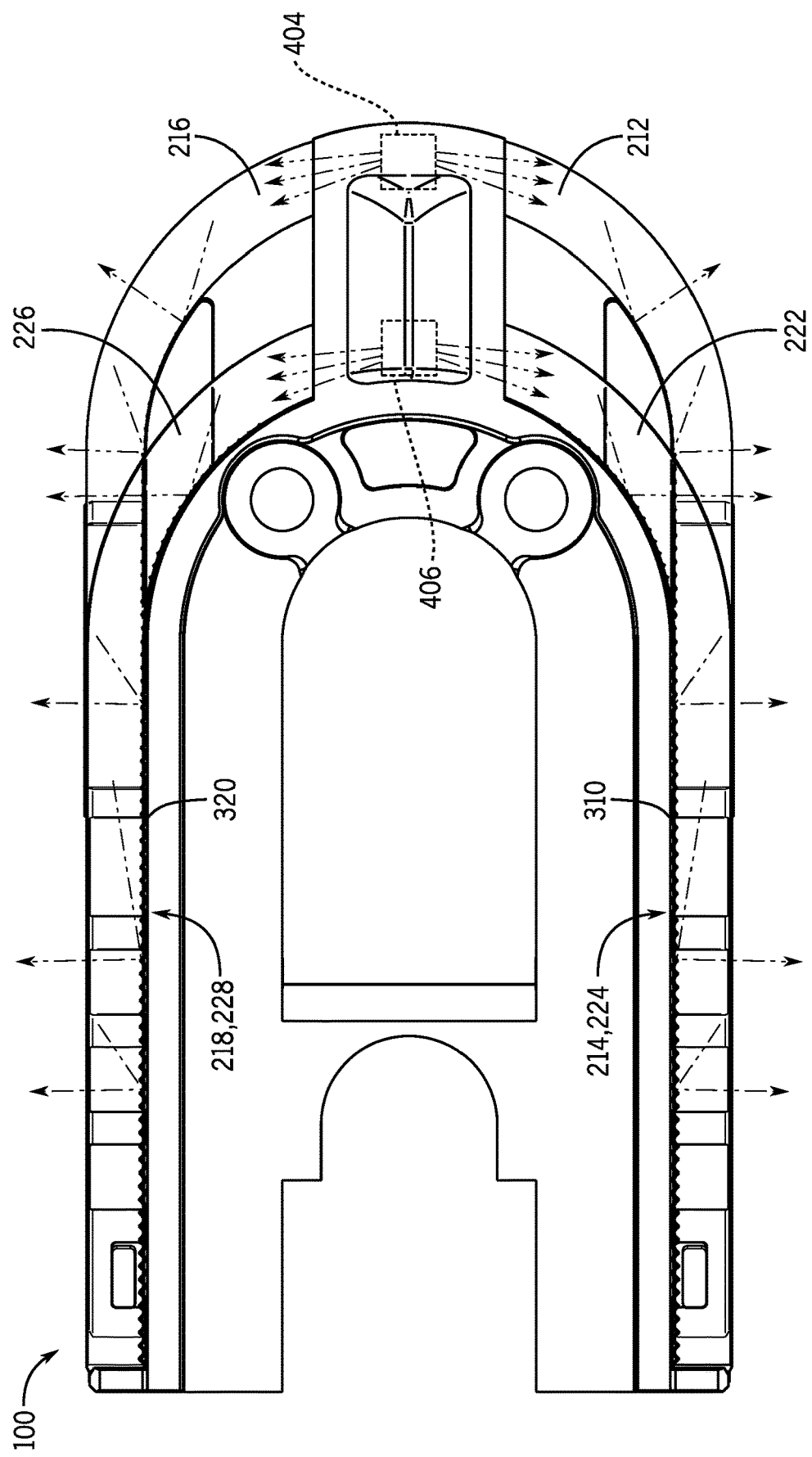
FIG. 9 is a top plan view of the example light distribution assembly, illustrating the reflection of light through the light distribution apparatus and the transmission of light out of the light distribution apparatus by way of its extraction features, according to the embodiment of FIG. 1.

As can be seen in FIGS. 1 and 8-10, light incident on extraction features 214, 218, 224, or 228 are directed in a transverse direction to the length of the light distribution apparatus, to be directed outwardly (e.g., away from light distribution apparatus 200), or may be directed inwardly (e.g., toward the opposite section of light distribution apparatus 200). Inwardly-directed light refracted out of extraction features 214, 218, 224, or 228 may be reflected off reflectors, such as reflectors 310 and 320 as shown in FIG. 9. As a result, light may be directed horizontally outward from the light distribution apparatus 200, and may advantageously illuminate portions of a light fixture that are not immediately proximate to a light source.

Figure 3A:
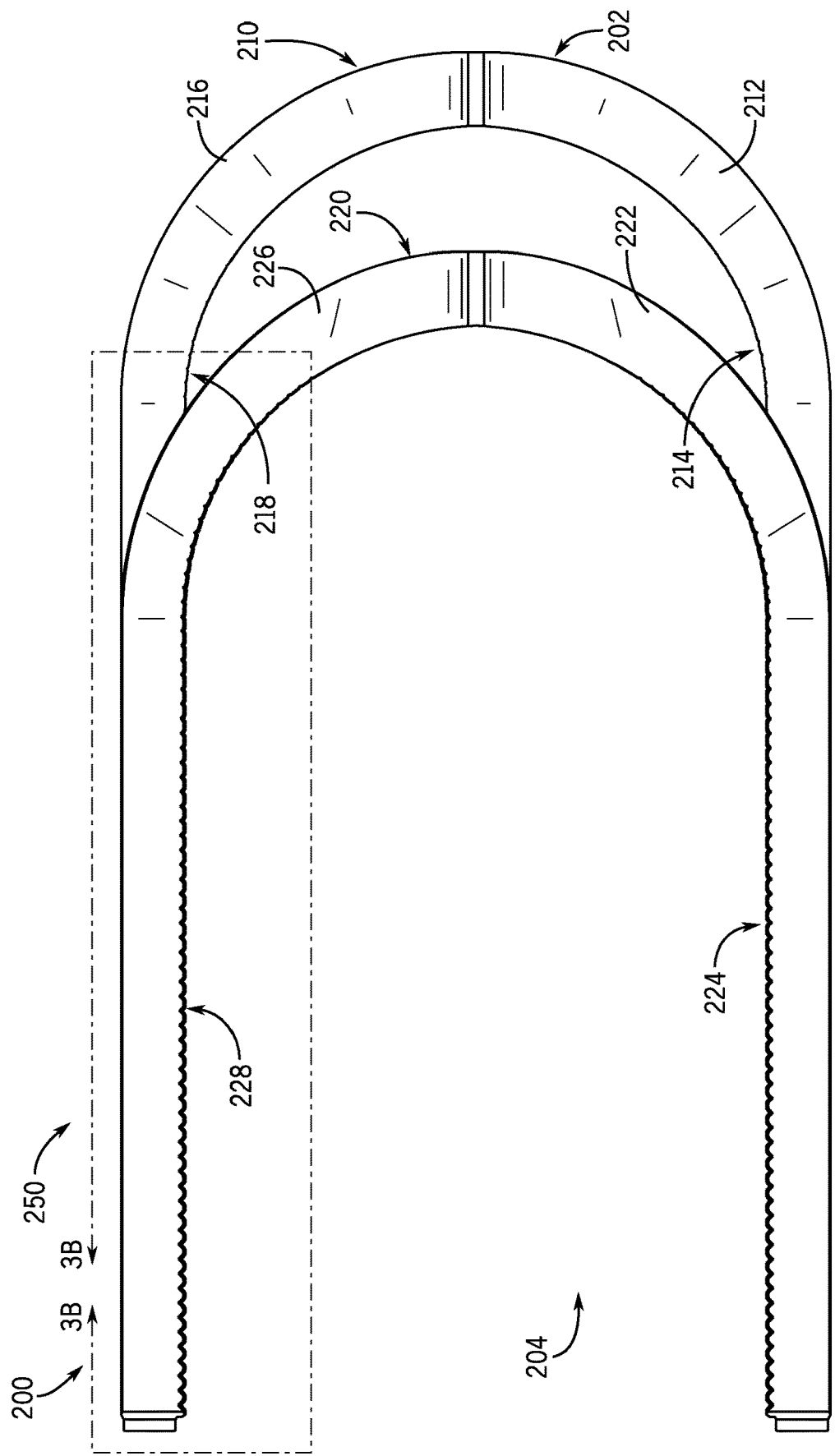
FIG. 3A is a top plan view of the example light distribution apparatus, according to the embodiment of FIG. 2.

FIG. 3A illustrates a top plan view of light distribution apparatus 200. As shown in FIG. 3A, waveguide 210 extends between first end 202 and second end 204, while waveguide 220 extends between a position some distance back, still between ends 202, 204 and second end 204. In some embodiments, waveguides 210 and 220 may have portions that overlap, abut, converge, or otherwise lie directly adjacent to each other. For instance, waveguide sections 212 and 222 have curvilinear sections that converge and substantially overlap along their lengths. Similarly, waveguide sections 216 and 226 have curvilinear sections that converge and substantially overlap.

Each waveguide 210 and 220 may receive light from a respective light source, which is transmitted from first end 202 toward second end 204. Light travelling through waveguides 210 and 220 may eventually become incident on one of extraction features 214, 218, 224, or 228, at which point the light is refracted and directed transverse to the length of light distribution apparatus 200 (see FIG. 9 for a conceptual representation of the refraction of light through extraction features 214, 218, 224, and 228).

In some embodiments, a particular set of extraction features, such as extraction features 228, may vary in size, shape, and/or in other dimensional respects. For example, the depth of extraction features 228 may increase moving from first end 202 toward second end 204. As another example, the density of extraction features 228 (e.g., the pitch or distance between adjacent extraction features) may increase, moving from first end 202 toward second end 204, without modulating the depth or size of the extraction features. Any combination of the size, shape, depth, pitch, density, and/or other dimensional aspects of extractions features may be modulated in order to, for example, increase the uniformity of light emitted (luminous exitance) along the length of light distribution apparatus 200. As light travels from first end 202 toward second end 204 of waveguide 220, some of the light reflected internally through waveguide 220 becomes incident on extraction features 228 which, in turn, is refracted transversely and exits waveguide 220. As a result, the amount of light (luminous flux per unit area) diminishes, moving from first end 202 to second end 204. Increasing the size of extraction features between first end 202 and second end 204 compensates for the reduction in luminous flux, as light is refracted out of light distribution apparatus 200.

Figure 3B:
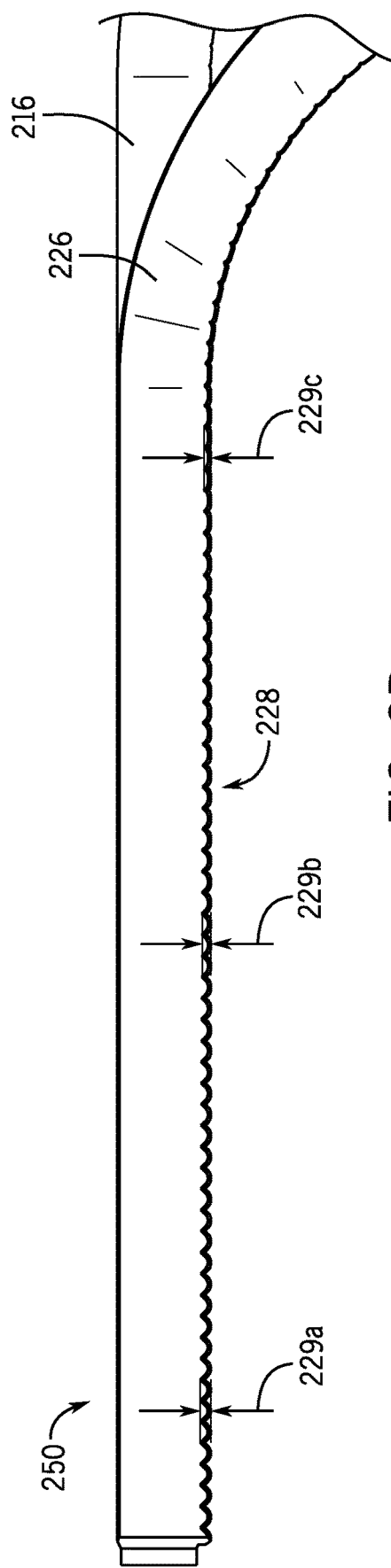
FIG. 3B is a detailed top plan view of a portion of the example light distribution apparatus, according to the embodiment of FIG. 3A.

FIG. 3B illustrates a more detailed top plan view of a portion 250 of example light distribution apparatus 200, viewed through region 3B-3B shown in dashed lines in FIG. 3A. As shown in FIG. 3B, extraction features 228 may increase in size or density, moving from first end 202 (the right side of FIG. 3B) toward second end 204 (the left side of FIG. 3B). For explanatory purposes, extraction feature differing depths 229*a*, 229*b*, and 229*c* are identified in FIG. 3B. Depth 229*c* represents the depth of an extraction feature of extraction features 228 near first end 202; depth 229*b* represents the depth of a different extraction feature of extraction features 228 between first end 202 and second end 204 and depth 229*a* represents the depth of another extraction feature of extraction features 228 near second end 204. In this example embodiment, depth 229*a* is larger than depth 229*b*, and depth 229*b* is larger than depth 229*c*—such that the depth of extraction features 228 increases moving from first end 202 toward second end 204. As described above, the increasing depth of extraction features 228 may induce relatively more light to refract out of light distribution apparatus 200, which compensates for the reduction in luminous flux moving from first end 202 toward second end 204 and producing substantially uniform luminous exitance along the length of light distribution apparatus 200 (or the portions of light distribution apparatus specifically designed to extract and convey light travelling therethrough).

Figure 4:
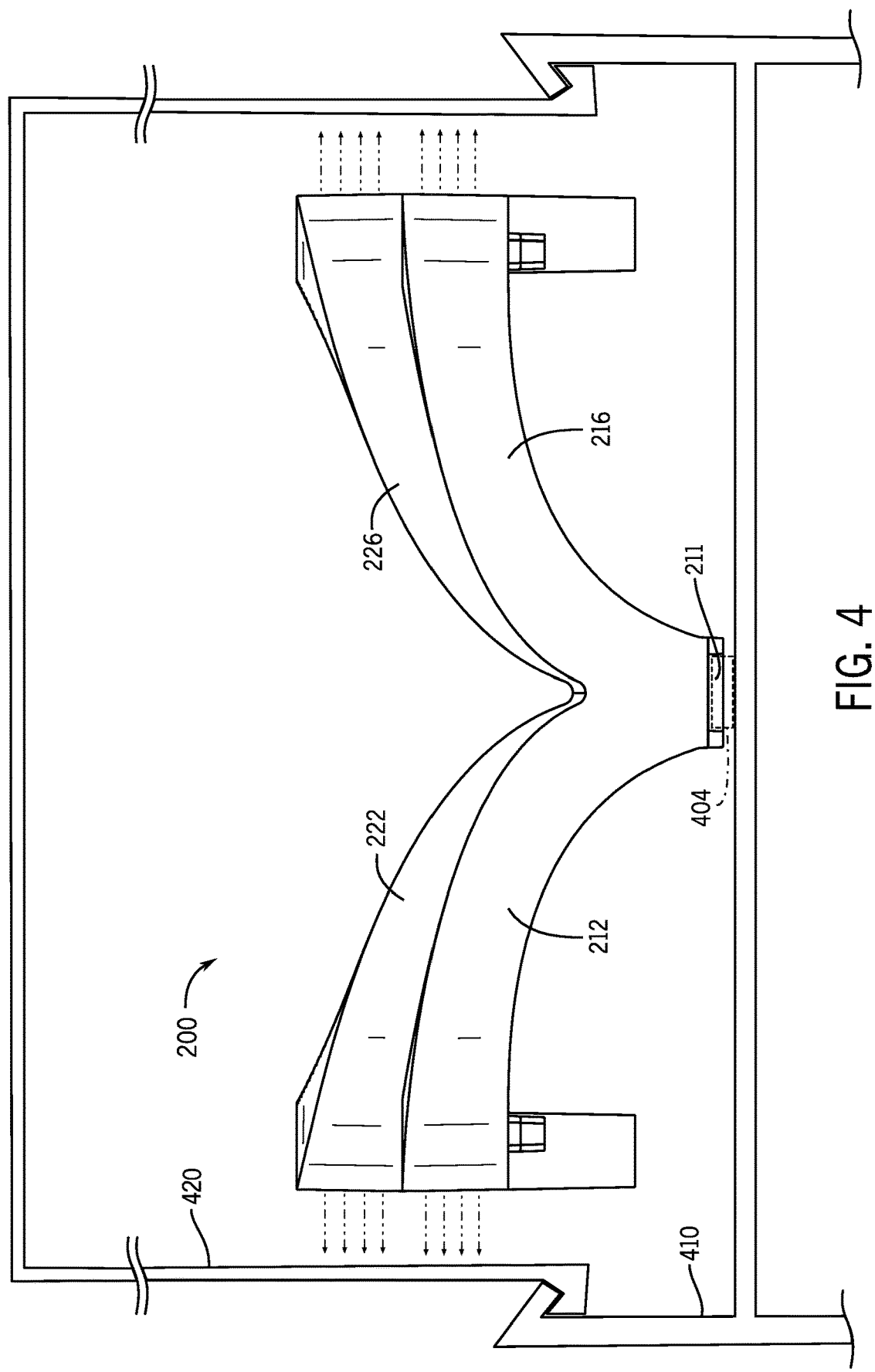
FIG. 4 is a front elevated view of the example light distribution apparatus positioned within a light fixture, according to the embodiment of FIG. 2.

FIG. 4 is a front elevated view of light distribution apparatus 200 positioned within a light fixture comprised of fixture housing 410 and lens 420. As shown in FIG. 4, waveguide section 222 vertically overlaps with a portion of waveguide section 212, and waveguide section 226 vertically overlaps with a portion of waveguide section 216. In some implementations, waveguide sections 212 and 222 may be rigidly affixed to each other (e.g., integrally formed together, adhered to each other, or otherwise coupled together).

As shown in FIG. 4, an example light fixture includes fixture housing 410 and lens 420 attached thereto. Fixture housing 410 may be constructed from extruded aluminum, for example, and include protrusions, tabs, or the like with which respective features of lens 420 interlock. As light is received from light sources (such as LEDs 404 and 406, which are shown in more detail in FIGS. 9 and 10) and transmitted through light distribution apparatus 200, it may be directed outwardly (e.g., in the direction of the dashed-line arrows shown in FIG. 4) toward the side walls of lens 420. In this manner, the regions of the sidewalls of lens 420 that are far from any light sources may be illuminated, providing an appearance of substantially even illumination along the length of the sidewalls of lens 420 from one end of the light fixture to the other.

Figure 5:
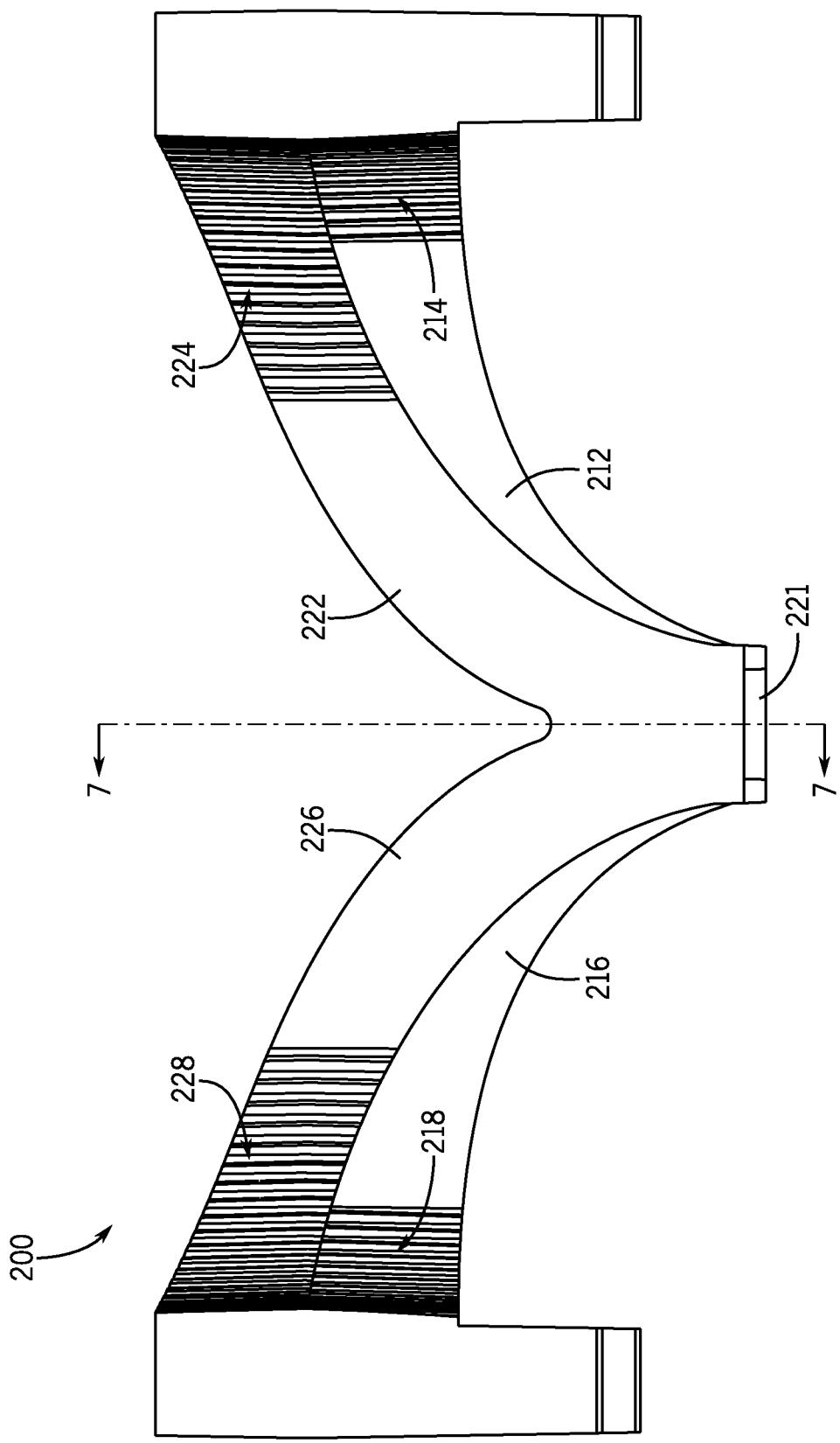
FIG. 5 is a rear plan view of the example light distribution apparatus, according to the embodiment of FIG. 2.

FIG. 5 depicts a rear plan view of light distribution apparatus 200, illustrating the extent to which waveguide sections 212 and 222 align and overlap, and the extent to which waveguide sections 216 to 226 align and overlap. The alignment and overlapping of waveguide sections 212 and 222, together with their respective extraction features 214 and 224, enables light from two different light sources (received via input couplers 211 and 221) to be transmitted and directed toward substantially the same region (to the right, when viewed from the perspective of FIG. 5). Likewise, the alignment and overlapping of waveguide sections 216 and 226, together with their respective extraction features 218 and 228, enables light received from two light sources by way of input couplers 211 and 221 respectively, to be transmitted and directed toward substantially the same region (to the left, when viewed from the perspective of FIG. 5).

Figure 6:
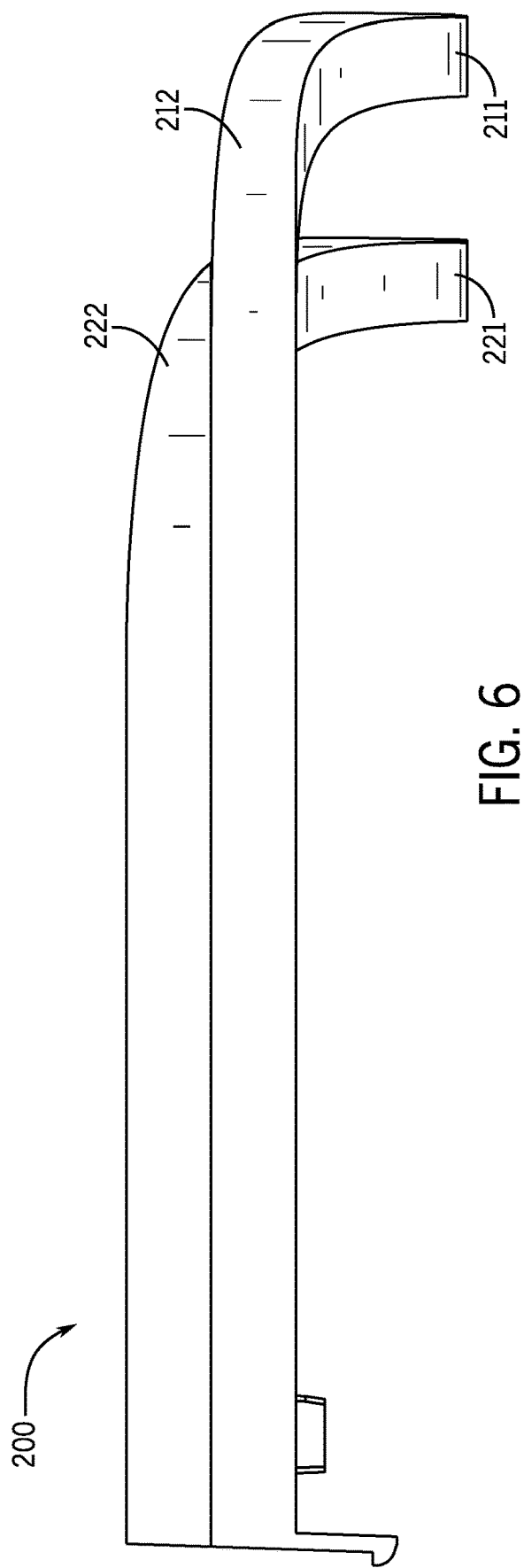
FIG. 6 is a side elevated view of the example light distribution apparatus, according to the embodiment of FIG. 2.

FIG. 6 illustrates a side elevated view of light distribution apparatus 200. As shown in FIG. 6, waveguide section 222 converges and overlaps over and above waveguide section 212. Light distribution apparatus 200 may have other protrusions, recesses, and/or other features formed thereon, therein, or therewithin for coupling light distribution apparatus 200 with support structure 300 (shown in more detail in FIGS. 1 and 8-10). For example, light distribution apparatus 200 may include an extended cantilever toward second end 204, which interlocks with a respective feature of support structure 300. Any combination of additional structural elements may be integrated with, or added to, light distribution apparatus 200 to provide structural support features for coupling with respective features on support structure 300, and/or for other purposes.

Figure 7:
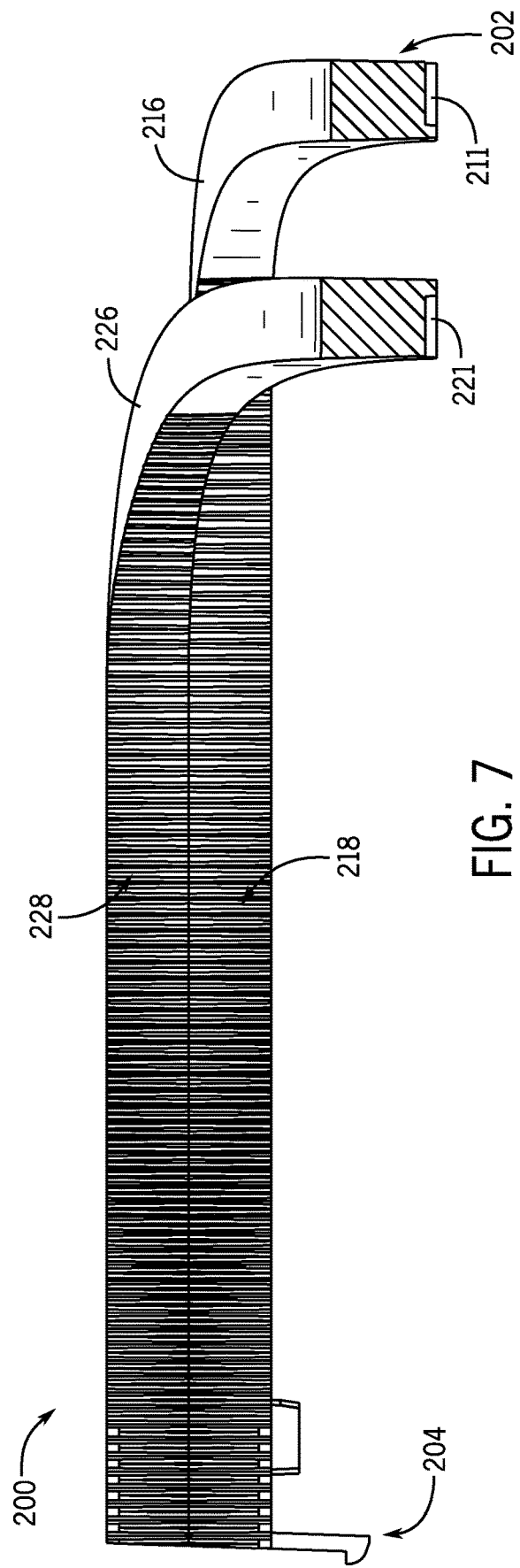
FIG. 7 is a side elevated sectional view of the example light distribution apparatus, taken along lines 7-7 of FIG. 5 and looking in the directions of the arrows.

FIG. 7 is a side elevated sectional view of light distribution apparatus 200, taken along lines 7-7 of FIG. 5 and looking in the directions of the arrows. As shown in FIG. 7, extraction features 218 and 228 may be in substantial alignment, such that the "peaks" and "valleys" of extraction features 218 align with corresponding peaks and valleys of extraction features 228. A similar alignment may also exist between extraction features 214 and 224 (shown in FIG. 5).

In other embodiments of the invention, the extraction features may purposely not be in alignment. For example, an alternative light distribution apparatus according to the present disclosure may have a shape and/or structure that would produce non-uniform or insufficiently uniform illumination if the extraction features were in alignment, such that misaligning overlapping extraction features may produce more uniform illumination. The present application contemplates that aspects of the geometry and dimensions of light distribution apparatus 200 may be varied for different types of light fixtures, and that aspects of the light distribution apparatus' design (e.g., the sizes and shapes of the waveguides, the sizes and shapes of the extraction features, etc.) may be adjusted depending upon the particular light fixture with which it is used.

FIG. 8 illustrates an example support structure 300 for supporting light distribution apparatus 200. Support structure 300 may have substantially complementary dimensions, surfaces, and overall geometry so as to be coupled with light distribution apparatus 200. Support structure 300 includes, one or more gaps extending between opposing reflectors 310 and 320, such as gap 302. The gaps, such as gap 302, may accommodate hardware for affixing suspension cables to a light fixture, enable passage of a power cable into a light fixture, and/or to accommodate other similar elements to be positioned between reflectors 310 and 320. Similar to light distribution apparatus 200, support structure 300 may be substantially U-shaped, about which light distribution apparatus 200 may be situated.

Support structure 300 may include ribs, teeth, and/or other structural features to enhance the structural integrity of light distribution assembly 100. For example, teeth 312 may support waveguide sections 212 and 222. Other protrusions, recesses, and/or other structures may also be provided within support structure 300 to specifically couple a corresponding light distribution apparatus thereto.

As also shown in FIG. 8, reflectors 310 and 320 may serve to redirect light incident thereon outwardly (e.g., substantially normal to the plane of reflectors 310 and 320, horizontally transverse to the axis defined by first end 202 and second end 204). Some light may be refracted by extraction features and directed toward reflectors 310 and 320, which may in turn reflect that light back. In this manner, most of the light refracted by extraction features 214, 218, 224, and 228 may be directed outwardly toward one or more regions of a light fixture, with little transmission loss. Reflectors 310 and 320, and/or the entire supporting structure 300, may be constructed from any suitable material, including plastics. In some implementations, reflectors 310 and 320 may be formed from a white plastic with high reflectivity, to minimize or reduce the loss of light by absorption.

FIG. 9 illustrates a top plan view of light distribution assembly 100, illustrating the reflection and refraction of light through light distribution apparatus 200 and the transmission of light out of light distribution apparatus 200 by way of its extraction features 214, 218, 224, and 228. As schematically depicted in FIG. 9, light emitted from light sources, such as LEDs 404 and 406, may be directed into light distribution apparatus 200 and become incident on extraction features 214, 218, 224, and 228 at a sufficiently acute angle so as to cause the light beams to be refracted transversely and horizontally outwardly from light distribution apparatus 100. Some light refracted by extraction features 214, 218, 224, and 228 may be directed outwardly (from the perspective shown in FIG. 9, upwardly by extraction features 218 and 228, and downwardly by extraction features 214 and 224). However, some light refracted by extraction features 214, 218, 224, and 228 may be directed inwardly (from the perspective shown in FIG. 9, downwardly by extraction features 218 and 228, and upwardly by extraction features 214 and 224). As described above, reflectors 310 and 320 may serve to redirect light directed inwardly by extraction features 214, 218, 224, and 228 to be directed outwardly and toward one or more desired regions of a light fixture (e.g., underlit regions far from a light source).

FIG. 10 illustrates an example configuration in which light distribution apparatus 200 of light distribution assembly 100 is positioned about a pair of light sources, such as LEDs 404 and 406. The following description describes the light sources as being LEDs—however, it should be understood that any suitable light source, LED, incandescent, fluorescent or otherwise, may be used without departing from the scope of the present disclosure.

In some implementations, such as the implementation shown in FIG. 10, a light fixture may include therein LED array 400 that has a plurality of spaced apart LEDs, such as LEDs 402, 404, and 406. Some LEDs, including LED 402, may emit light that illuminates a portion of a light fixture, such as a lens or diffuser. LEDs 404 and 406, on the other hand, may, in some implementations, be surrounded by or adjacent to input couplers 211 and 221, respectively, such that light emitted by LEDs 404 and 406 are transmitted through light distribution apparatus 200. Light distribution apparatus 200 may serve to direct light from LEDs 404 and 406 horizontally outward (e.g., transverse to the length of light distribution apparatus 200 and/or transverse to the length of LED array 400).

In an example embodiment, a light fixture may be substantially rectangular in shape, with upward, "indirect" illumination provided by upwardly-emitting light sources within the light fixture, such as LED array 400. This example light fixture may have a rectangular diffuser that extends upwardly, such that sidewalls of the rectangular diffuser extend beyond the end of the light fixture (e.g., a "pop-up" lens). The diffuser may be positioned to substantially cover LED array 400 and light distribution assembly 100, and provide upward illumination, as well as horizontally outward illumination through its sidewalls. Some LEDs of LED array 400, such as LED 402, may direct light upwardly and outwardly (e.g., at some angle of emission, such as 120 degrees) to illuminate both the horizontal and vertical surfaces of the diffuser. However, LED array 400 may terminate with LEDs 404 and 406 at some distance from the end of the light fixture, such that LED array 400 alone would produce underlit portions of the rectangular diffuser near the ends of the light fixture.

With light distribution assembly 100, however, LEDs 404 and 406 may emit light that is distributed axially toward the end of the light fixture, and horizontally outward, so as to illuminate the portion of the sidewalls of the rectangular diffuser near the end of the light fixture. Although the top surface of the diffuser near the end of the light fixture may appear dimly lit when viewed from above (due to the light emitted by LEDs 404 and 406 being redirected in the horizontal direction), the light fixture may be mounted to a wall or hung from the ceiling as a pendant light, such that a viewer would not observe the difference in illumination from the top of the light fixture. Advantageously, light distribution assembly 100 may illuminate the portion of the sidewalls of the diffuser—the "glowing" portion of the light fixture visible from the sides or below the light fixture— such that the sidewalls of the diffuser appear to be substantially evenly lit across the length of the light fixture. In this manner, light distribution assembly 100 may enhance both the illumination and the aesthetics of a light fixture, without the addition of supplemental light sources, while accommodating mounting and power supply hardware.

While extraction features shown and described herein involve the removal of material from, or the formation of patterns on, a surface of an optical waveguide, it will be understood that extraction features may be formed via surface printing (e.g., silk screen printing, inkjet printing, etc.), additive manufacturing processes (e.g., deposition of material on the surface of the waveguide), and/or other suitable processes. It should be understood that the present disclosure is not limited to extraction features formed through any specific process, and that any suitable means of forming extraction features may be used in constructing a light distribution apparatus according to the present invention.

In various embodiments, the cross-sectional area of an optical waveguide may be non-uniform when moving from an input coupler toward the opposite end of the waveguide. As light travels through an optical waveguide of the present invention, some of that light may be refracted outwardly by way of extraction features. As a result, in a uniform cross-sectional area optical waveguide, the luminous flux through a cross-section of the waveguide near the input may be more intense relative to a cross-section of the waveguide at the opposite end. To mitigate this reduction in luminous flux, the cross-sectional area of the optical waveguide may be decreased, or otherwise altered to compensate, moving from the input coupler toward the opposite end of the waveguide. For example, the width of the optical waveguide may decrease moving from the input coupler toward the opposite end of the waveguide. In this manner, the luminous flux through the optical waveguide may stay substantially constant, or may diminish in intensity to a lesser degree compared to optical waveguides with uniform cross-sectional areas—further improving the uniformity of light emitted (luminous exitance) along the length of the optical waveguide.

Although the example light distribution apparatus 200 shown and described herein is comprised of two wishbone-shaped waveguides that each distribute light from a respective light source along two paths, other configurations may also be used. For example, a light distribution apparatus may be configured to have one light source direct light through one waveguide to one side, and have another light source direct light through a different waveguide to the opposite side—such that the light distribution apparatus is asymmetrical. In other implementations, a light distribution apparatus may receive light from a single light source, or from three or more light sources. The number of light sources, the dimensions and configuration of waveguides, and/or other aspects of the design of a light distribution assembly according to the present invention may vary, depending upon the particular light fixture, light sources, and the desired aesthetics.

Although certain example methods and apparatuses have been described herein, the scope of coverage of this patent is not limited thereto. On the contrary, this patent covers all methods, apparatuses, and articles of manufacture fairly falling within the scope of the appended claims, either literally or under the doctrine of equivalents.

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or as other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A light distribution apparatus for a light fixture for directing light emitted from one or more light sources toward one or more regions of the fixture distanced from the one or more light sources, the light distribution apparatus comprising:
    an input coupler adapted for positioning about a light source and configured to direct light emitted by said light source along a first path and a second path;
    a first curvilinear waveguide having a first end and a second end, said first end of the first curvilinear waveguide extending from said input coupler, wherein the first path is defined by the input coupler and the first curvilinear waveguide;
    a second curvilinear waveguide having a first end and a second end, said first end of the second curvilinear waveguide extending from said input coupler, wherein the second path is defined by the input coupler and the second curvilinear waveguide;
    a first set of extraction features formed along a surface of the first curvilinear waveguide, in which said first set of extraction features directs light transmitted along the first path out of the first curvilinear waveguide; and
    a second set of extraction features formed along a surface of the second curvilinear waveguide, in which said second set of extraction features directs light transmitted along the second path out of the second curvilinear waveguide.

2. The light distribution apparatus according to claim 1, in which said first set of extraction features extends between the first end of said first curvilinear waveguide and the second end of said first curvilinear waveguide, said first set of extraction features comprising a first extraction feature proximate to the first end and a second extraction feature proximate to the second end, wherein said first extraction feature has a first size and said second extraction feature has a second size, and wherein the second size is larger than the first size.

3. The light distribution apparatus according to claim 1, further comprising:
    a first reflector positioned adjacent to said first set of extraction features, said first reflector being adapted to reflect light refracted by the first set of extraction features and incident on a surface of the first reflector toward a first region; and a second reflector positioned adjacent to said second set of extraction features, said second reflector being adapted to reflect light refracted by the second set of extraction features and incident on a surface of the second reflector toward a second region.

4. The light distribution apparatus according to claim 1, in which the input coupler, the first curvilinear waveguide, and the second curvilinear waveguide comprise an optical waveguide, and wherein the light distribution apparatus further comprises:

a support structure having a shape that is substantially complementary with said optical waveguide, said support structure being adapted to engage with the optical waveguide for maintaining the optical waveguide in position with respect to a light fixture.

5. The light distribution apparatus according to claim 4, in which said support structure comprises one or more apertures for receiving one or more respective fasteners configured to engage with a portion of a light fixture to rigidly couple the light distribution apparatus thereto.

6. The light distribution apparatus according to claim 1, in which said input coupler is a first input coupler adapted for positioning about a first light source, and wherein the light distribution apparatus further comprises:

a second input coupler adapted for positioning about a second light source and configured to direct light emitted by said second light source along a third path and a fourth path;

a third curvilinear waveguide having a first end and a second end, said first end of the third curvilinear waveguide extending from said second input coupler, wherein the third path is defined by the second input coupler and the third curvilinear waveguide;

a fourth curvilinear waveguide having a first end and a second end, said first end of the fourth curvilinear waveguide extending from said second input coupler, wherein the fourth path is defined by the second input coupler and the fourth curvilinear waveguide;

a third set of extraction features formed along a surface of the third curvilinear waveguide, in which said third set of extraction features directs light transmitted along the third path out of the third curvilinear waveguide; and a fourth set of extraction features formed along a surface of the fourth curvilinear waveguide, in which said fourth set of extraction features directs light transmitted along the fourth path out of the fourth curvilinear waveguide, wherein said first path and said third path are substantially adjacent such that the first and third sets of extraction features direct light in substantially similar directions, and wherein said second path and said fourth path are substantially adjacent such that the second and third sets of extraction features direct light in substantially similar directions.

7. The light distribution apparatus according to claim 6, said light distribution apparatus having a first end proximate to said first input coupler and a second end proximate to the second ends of the first and second curvilinear waveguides, in which said second input coupler is positioned between the first input coupler and the second end of the light distribution apparatus.

8. The light distribution apparatus according to claim 6, in which said third curvilinear waveguide at least partially vertically overlaps with said first curvilinear waveguide, and in which said fourth curvilinear waveguide at least partially vertically overlaps with said fourth curvilinear waveguide.

9. A light fixture assembly comprising:

a housing having a first end and a second end;

a plurality of light sources extending between a first location proximate to the first end of said housing and a second location proximate to the second end of said housing, in which an underlit section of said housing extends between its first end and said first location;

a diffuser extending substantially between the first and second ends of said housing adapted to direct light emitted by the plurality of light sources in a direction transverse to a direction defined by the first and second ends of the housing; and a light distribution apparatus for directing light emitted from one or more of the plurality of light sources toward the underlit section of said housing, said light distribution apparatus comprising:

at least one input coupler positioned about a light source of the plurality of light sources proximate to the first location, said at least one input coupler being configured to direct light emitted by said light source along a path;

a curvilinear waveguide having a first end and a second end, said first end of the curvilinear waveguide extending from said input coupler and toward the first end of said housing, wherein the path is defined by the input coupler and the first curvilinear waveguide; and a set of extraction features formed along a surface of the curvilinear waveguide, in which said set of extraction features directs light transmitted along the path out of the curvilinear waveguide and toward a portion of said diffuser covering the underlit section of said housing.

10. A light distribution apparatus for a light fixture for directing light emitted from one or more light sources toward one or more regions of the fixture distanced from the one or more light sources, the light distribution apparatus comprising:

a first input coupler adapted for positioning about a first light source and configured to direct light emitted by said first light source along a first path;

a second input coupler adapted for positioning about a second light source and configured to direct light emitted by said second light source along a second path;

a first curvilinear waveguide having a first end and a second end, said first end of the first curvilinear waveguide extending from said first input coupler, wherein the first path is defined by the first input coupler and the first curvilinear waveguide;

a second curvilinear waveguide having a first end and a second end, said first end of the second curvilinear waveguide extending from said second input coupler, wherein the second path is defined by the second input coupler and the second curvilinear waveguide;

a first set of extraction features formed along a surface of the first curvilinear waveguide, in which said first set of extraction features directs light transmitted along the first path out of the first curvilinear waveguide; and a second set of extraction features formed along a surface of the second curvilinear waveguide, in which said second set of extraction features directs light transmitted along the second path out of the second curvilinear waveguide.

11. A light distribution apparatus for a light fixture for directing light emitted from one or more light sources within the fixture toward at least one region of the fixture distanced from the one or more light sources, the light distribution apparatus comprising:
- an input coupler adapted for positioning about a light source and configured to direct light emitted by said light source along a path;
- a curvilinear waveguide having a first end and a second end, said first end of the curvilinear waveguide extending from said input coupler, wherein the path is defined by the input coupler and the curvilinear waveguide; and
- a set of extraction features formed along a surface of the curvilinear waveguide, in which said set of extraction features directs light transmitted along the path out of the curvilinear waveguide.

* * * * *